United States Patent [19]
Takahara et al.

[11] Patent Number: 4,515,706
[45] Date of Patent: May 7, 1985

[54] RARE EARTH OXYFLUORIDE BARIUM FLUORIDE HALIDE PHOSPHOR

[75] Inventors: Takeshi Takahara; Tsutomu Ishii; Yasuhiro Shirakawa, all of Kanagawa, Japan

[73] Assignee: Kabushiki Kaisha Toshiba, Tokyo, Japan

[21] Appl. No.: 615,370

[22] Filed: May 30, 1984

[30] Foreign Application Priority Data

May 31, 1983 [JP] Japan .................................. 58-94808
Jun. 8, 1983 [JP] Japan ................................ 58-100869

[51] Int. Cl.$^3$ ........................................... C09K 11/477
[52] U.S. Cl. ............................................ 252/301.4 H
[58] Field of Search .............. 252/301.4 H; 250/483.1, 250/484.1, 327.2

[56] References Cited

U.S. PATENT DOCUMENTS 3,621,340 11/1971 Singh et al. ............. 252/301.4 H X
3,659,136 4/1972 Grodkiewicz et al. ... 252/301.4 H X
3,822,215 7/1974 Grodkiewicz et al. ..... 252/301.4 H
4,075,495 2/1978 Stevels et al. ........... 252/301.4 H X
4,180,478 12/1979 Omi et al. ................... 252/301.4 H

FOREIGN PATENT DOCUMENTS 0022564 1/1981 European Pat. Off. ..... 252/301.4 H

Primary Examiner—Jack Cooper
Attorney, Agent, or Firm—Banner, Birch, McKie & Beckett

[57] ABSTRACT

A compound having the general formula $$a\text{ReOF}\cdot(1-a)\text{Ba}_{(1-x)}\text{M}_x\text{FX:Eu}_y,$$

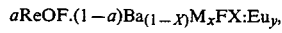

where Re is one element selected from the group consisting of Lu and Y, M is at least one element selected from the group consisting of Be, Mg, Ca, Sr, Zn, and Cd, X is at least one element selected from the group consisting of Cl, Br, and I, a is a positive number less than or equal to 0.6, x is in the range from 0 to 0.5, inclusive, and y is in the range from $10^{-6}$ to $2\times10^{-1}$, inclusive, is useful as a phosphor, especially in X-ray imaging.

4 Claims, 6 Drawing Figures

RARE EARTH OXYFLUORIDE BARIUM FLUORIDE HALIDE PHOSPHOR

BACKGROUND OF THE INVENTION

This invention deals with a europium-activated phosphor including a rare earth oxyfluoride, which may be used in an X-ray image converter panel.

Conversion of an X-ray image into a visible image has, for a long time, been accomplished by directing the X-ray image onto a photographic film which has an emulsion of a silver salt as a photosensitive layer. The image can be improved by first converting the X-ray image into visible radiation using an X-ray image intensifying screen, and then projecting the visible radiation onto the photographic film. It would be desirable, however, to eliminate the use of photographic film altogether, because of the high cost of silver.

Phosphors are known which emit visible light when scanned or energized by visible or infrared radiation after having been exposed to ionizing radiation, such as X-rays. This phenomenon is called "stimulability," and the phosphors which possess this property are called stimulable phosphors.

A method of producing visible images using stimulable phosphors is disclosed in U.S. Pat. No. 3,859,527. X-rays passing through a subject illuminate a radiation image converting panel, storing a pattern of radiation in the phosphor particles of the panel. The stored pattern may be released as fluorescence when the phosphor particles are scanned or energized by visible or infrared radiation. The fluorescence, called stimulated radiation, is then sensed by a photomultiplier which converts it to electrical signals representative of the image. It is desirable, of course, that as small a dose of radiation as possible be given to the subject; and one way to reduce the amount of radiation is to use a phosphor which emits stimulated radiation of higher luminous intensity (I).

While X-ray intensifying screens are known which use a europium-activated alkaline earth metal fluoride halide phosphor (See Canadian Pat. No. 896,453 and U.S. Pat. No. 4,075,495), even this stimulable phosphor does not emit stimulated radiation of sufficient luminous intensity.

SUMMARY OF THE INVENTION

One object of the present invention is to provide a stimulable phosphor, the stimulated radiation from which has a higher luminous intensity than that of known phosphors.

Another object of the present invention is to provide a phosphor suitable for use in a radiation image converting system.

The inventors have discovered, as a result of experimentation with various divalent metal and rare earth compounds, that the use of either lutetium oxyfluoride or yttrium oxyfluoride as a component in a stimulable phosphor greatly increases the luminous intensity I of the stimulated radiation.

A phosphor according to the present invention has the general formula $$aReOF \cdot (1-a)Ba(1-x)M_xFX:Eu_y \quad (1)$$

where Re is one rare earth element selected from the group consisting of Y and Lu, M is at least one element selected from the group consisting of Be, Mg, Ca, Sr, Zn, and Cd, X is at least one element selected from the group consisting of Cl, Br, and I, a is a positive number less than or equal to 0.6, x is from 0 to 0.5, inclusive, and y is from $10^{-6}$ to $2 \times 10^{-1}$, inclusive.

The stimulable phosphor of this invention has a good sensitivity for scanning or energizing radiation, that is, the radiation which is used to "read out" the energy stored in the phosphor, which has a wavelength of 550 nm. This means that light from an argon laser can be used as the scanning or energizing radiation, resulting in a higher luminous intensity I of stimulated radiation, because light from an argon laser can apply more energy to the stimulable phosphor than light from, for example, a conventional helium-neon laser.

DETAILED DESCRIPTION OF THE PREFERRED EMBODIMENT

Figure 1:
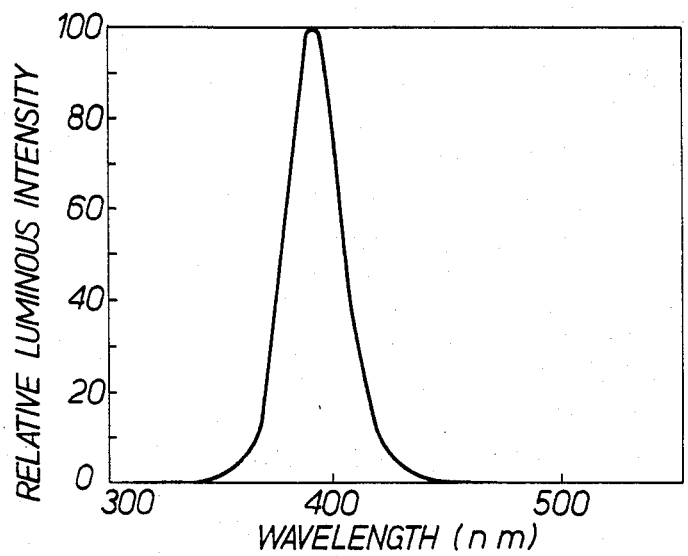
FIG. 1 shows the spectrum of stimulated radiation emitted from an example of a stimulable phosphor in accordance with the invention whose formula is $0.3LuOF \cdot 0.7BaFBr:Eu_{0.0005}$.
Figure 4:
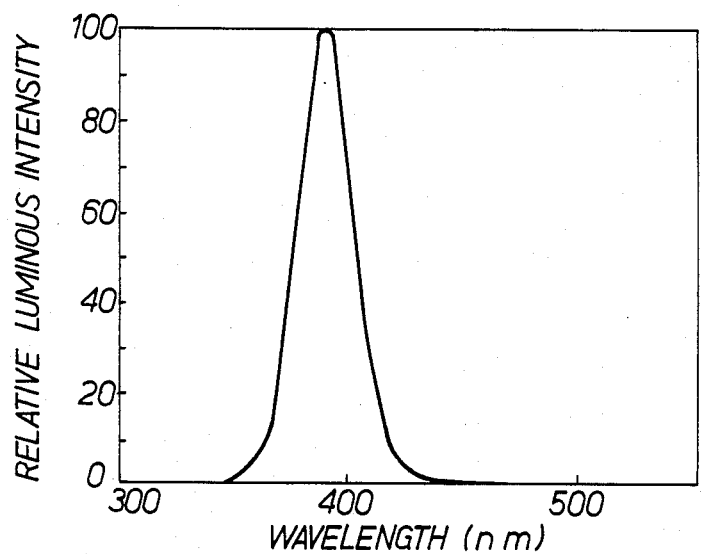
FIG. 4 shows the spectrum of stimulated radiation emitted from an example of a stimulable phosphor in accordance with the invention whose formula is $0.2YOF \cdot 0.8BaFBr:Eu_{0.0005}$.

FIGS. 1 and 4 show the spectrum of stimulated radiation emitted by two examples of stimulated phosphors in accordance with the invention, one consisting of $0.3LuOF \cdot 0.7BaFBr:Eu_{0.0005}$ and the other consisting of $0.2YOF \cdot 0.8BaFBr:Eu_{0.0005}$. These emission spectra were measured by scanning or energizing the phosphors with light having a wavelength of 550 nm after each phosphor was exposed to an X-ray of 80 kV$_p$.[1] As can be seen from FIGS. 1 and 4, both of these phosphors have an emission spectrum with a peak at about 390 nm.

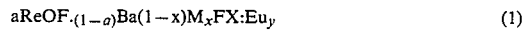

[1] The voltage value given here is the peak dc input voltage to the X-ray tube. This a conventional way of indicating X-ray intensity.

Figure 2:
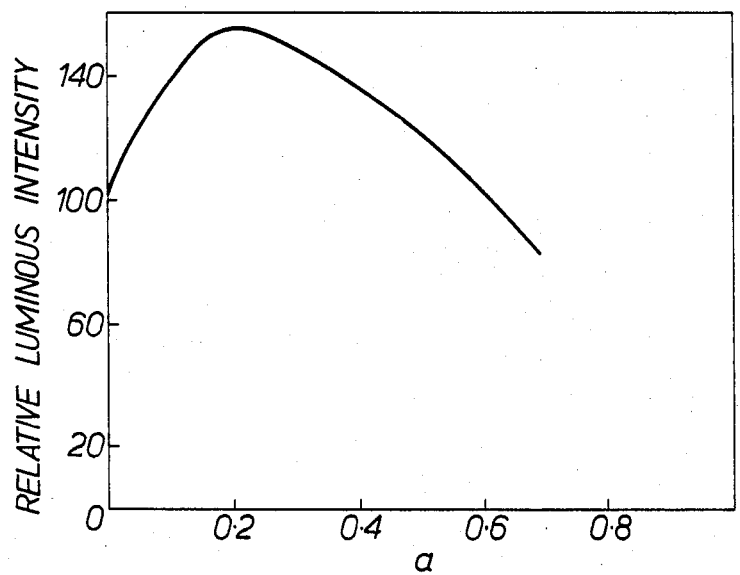
FIG. 2 is a graph of the relationship between the value of the variable a in general formula (1) and the relative luminous intensity of stimulated radiation emitted by a phosphor according to the invention, consisting of $aLuOF \cdot (1-a)BaFBr:Eu_{0.0005}$.
Figure 5:
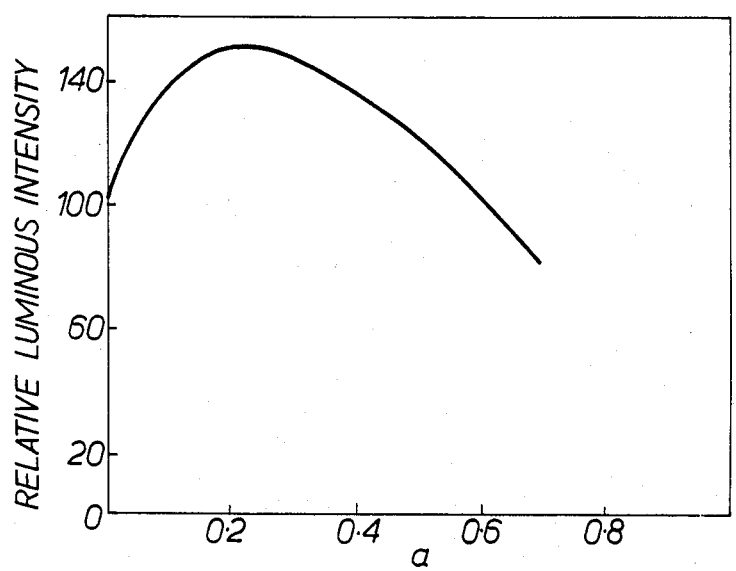
FIG. 5 is a graph of the relationship between the value of the variable a in general formula (1) and the relative luminous intensity of stimulated radiation emitted by a phosphor according to the invention, consisting of $aYOF \cdot (1-a)BaFBr:Eu_{0.0005}$.

A suitable value of the variable a in general formula (1) is less than or equal to 0.6 but greater than 0. This may be seen by referring to FIGS. 2 and 5, graphs of the relationship between the value of the variable a and the relative luminous intensity of stimulated radiation emitted by one stimulable phosphor consisting of $aLuOF \cdot (1-a)BaFBr:Eu_{0.0005}$ and another stimulable phosphor consisting of aYOF.(1−a)BaFBr:Eu$_{0.0005}$, respectively, when each phosphor is scanned by light having a wavelength of 550 nm after being exposed to an 80 kV$_p$ X-ray. In measuring relative luminous intensity in FIGS. 2 and 5, the stimulated radiation of the phosphor according to the invention was compared with stimulated radiation from a conventional phosphor consisting of BaFBr:Eu$_{0.0005}$. The stimulated radiation from the conventional phosphor was taken to have a luminous intensity equal to 100. As seen from these graphs, in the case of constant amount of Eu, when the variable a is less than or equal to 0.6 but greater than 0, the phosphors of the invention emit stimulated radiation of a higher luminous intensity than that emitted by the conventional phosphor used for comparison. Luminous intensity is especially high when a is in the range from 0.05 to 0.5, inclusive.

A suitable value of the variable x in general formula (1) is from 0 to 0.5, inclusive. This may be seen by referring to FIGS. 3 and 6, graphs of the relationship between the value of the variable x (which represents the amount of substitution of Sr for Ba) and the relative luminous intensity of stimulated radiation emitted by one stimulable phosphor consisting of 0.2LuOF.0.8Ba$_{(1-x)}$Sr$_x$FBr:Eu$_{0.0005}$ and another consisting of 0.2YOF.0.8Ba$_{(1-x)}$Sr$_x$FBr:Eu$_{0.0005}$, respectively, when each phosphor is scanned or energized by light having a wavelength 550 nm after being exposed to an 80 kV$_p$ X-ray. The stimulated radiation of each phosphor according to the invention was compared with the stimulated radiation of the same phosphor with x equal to 0 (and this value was taken to be 100). As is apparent from FIGS. 3 and 6, a suitable range for the value of x is between 0 and 0.5, inclusive, because above 0.5 the relative luminous intensity of emitted stimulated radiation falls off sharply. A preferred range of x is between 0 and 0.2, inclusive.

Figure 3:
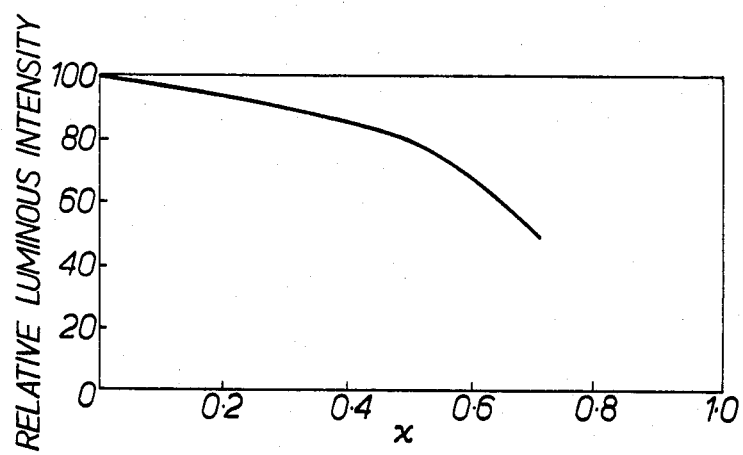
FIG. 3 is a graph of the relationship between the value of the variable x, which represents the amount of substitution of Sr for Ba in general formula (1), and the relative luminous intensity of stimulated radiation emitted by a phosphor according to the invention, consisting of $0.2LuOF \cdot 0.8Ba_{(1-x)}Sr_xFBr:Eu_{0.0005}$.
Figure 6:
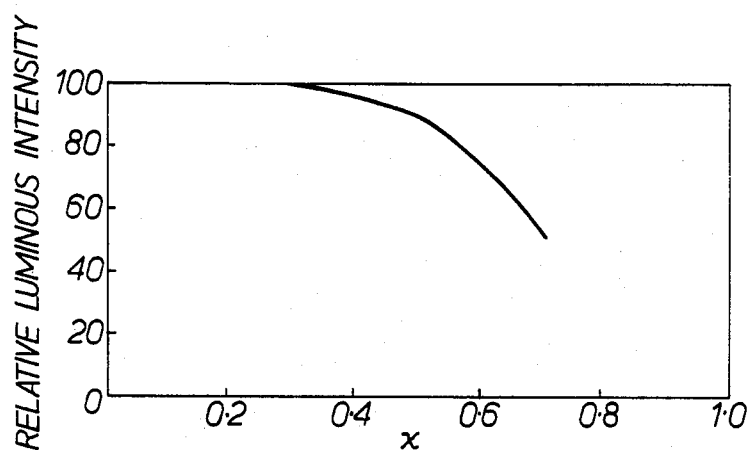
FIG. 6 is a graph of the relationship between the value of the variable x, which represents the amount of substitution of Sr for Ba in general formula (1), and the relative luminous intensity of stimulated radiation emitted by a phosphor according to the invention, consisting of $0.2YOF \cdot 0.8Ba_{(1-x)}Sr_xFBr:Eu0.0005$.

Instead of Sr, part of the Ba in the phosphors according to the invention may be replaced by at least one element from the group consisting of Be, Mg, Ca, Zn, and Cd; in these cases, the graphs of the relationship between the variable x and the relative luminous intensity of emitted stimulated radiation are similar to those shown in FIGS. 3 and 6. In these cases, also, a suitable range for the value of x is between 0 and 0.5, inclusive, because luminous intensity falls off sharply above 0.5.

A suitable value for the variable y in the general formula is from $10^{-6}$ to $2\times10^{-1}$, inclusive. If the value of y is less than $10^{-6}$, the luminous intensity of emitted stimulated radiation decreases; and if the value of y is greater than $2\times10^{-1}$, quenching of the emitted light occurs, also reducing its intensity. The preferred range for the value of y is from $10^{-5}$ to $10^{-2}$, inclusive. The relationship between the value of the variable y and relative luminous intensity of emitted stimulated radiation is similar to the curves shown in FIGS. 2 and 5.

To produce the phosphor of the invention, the first step is to weigh and mix (in a ball mill or mixture mill) the correct amounts of the ingredients listed below in items (i) to (v) so that the final phosphor stoichiometrically has a composition indicated by the general formula aReOF.(1−a)Ba$_{(1-x)}$M$_x$FX:Eu$_y$, wherein Re is one element selected from the group consisting of Lu and Y, M is at least one element selected from the group consisting or Be, Mg, Ca, Sr, Zn, and Cd, X is at least one element selected from the group consisting of Cl, Br, and I, and where a is less than or equal to 0.6 but greater than 0, x is in the range from 0 to 0.5, inclusive, and y is in the range from $10^{-6}$ to $2\times10^{-1}$, inclusive.

(i) Barium fluoride (BaF$_2$)
(ii) At least one compound selected from the group consisting of BeF$_2$, MgF$_2$, CaF$_2$, SrF$_2$, ZnF$_2$, and CdF$_2$
(iii) At least one compound selected from the group consisting of BaCl$_2$, BaBr$_2$, and BaI$_2$
(iv) At least one compound selected from the group consisting of ReF$_3$, Re$_2$O$_3$ and ReOF (Re is Lu or Y)
(v) EuF$_3$ Next, the mixed ingredients are placed in a heat resisting container, such as an alumina or quartz crucible, and then calcined in an electric furnace at a temperature in the range from 873K to 1273K, and preferably at a temperature of 973K to 1223K. Although the period of time of calcination depends upon the amount of phosphor material in the crucible and the calcination temperature, normally one to six hours will be required. Calcination may be carried out in air, but preferably the atmosphere is a reducing atmosphere such as N$_2$ or a mixture of N$_2$ and H$_2$.

After calcination, the phosphor is processed through the normal steps used in phosphor manufacture, such as pulverization, washing, drying, sifting, and so on. The luminous intensity of the emitted stimulated radiation from the phosphor may be increased if it is calcined again after pulverization.

EXAMPLES

The following 24 examples of phosphors in accordance with the invention were all manufactured in the same manner. The ingredients for each example (see Table 1) were first weighed and mixed in a ball mill and then placed in a quartz crucible in an electric furnace. Calcination was carried out for two hours at 1123K in an atmosphere of N$_2$ with 2 percent H$_2$. After calcination, the crucible was removed from the furnace and the calcined material rapidly cooled. The material was then pulverized and the phosphor obtained by sifting the pulverized material so that phosphor particles of uniform size remained.

TABLE 1

Ingredients of Specific Phosphor Examples (1) LuOF 42.0 g (0.2 mol), BaF$_2$ 67.6 g (0.3995 mol), BaBr$_2$.2H$_2$O 133.3 g (0.4 mol), EuF$_3$ 0.104 g (0.0005 mol)

(2) LuOF 42.0 g (0.2 mol), BaF$_2$ 33.9 g (0.2 mol), BaBr$_2$.2H$_2$O 133.3 g (0.4, mol), EuF$_3$ 41.8 g (0.2 mol)

(3) LuOF 42.0 g (0.2 mol), BaF$_2$ 67.7 g (0.4 mol), BaBr$_2$.2H$_2$O 133.3 g (0.4 mol), EuF$_3$ 0.0002 g ($10^{-6}$ mol)

(4) Lu$_2$O$_3$ 26.7 g (0.067 mol), LuF$_3$ 15.5 g (0.067 mol), BaF$_2$ 67.6 g (0.3995 mol), BaBr$_2$.2H$_2$O 66.6 g (0.2, mol), BaCl$_2$.2H$_2$O 48.9 g (0.2 mol), EuF$_3$ 0.104 g (0.0005 mol)

(5) LuOF 21.0 g (0.1 mol), BaF$_2$ 76.1 g (0.4495 mol), BaI$_2$.2H$_2$O 192.2 g (0.45 mol), EuF$_3$ 0.104 g (0.0005 mol)

(6) LuOF 42.0 g (0.2 mol), BaBr$_2$.2H$_2$O 133.3 g (0.4, mol), SrF$_2$ 50.2 g (0.4 mol), EuF$_3$ 104. g (0.0005 mol)

(7) LuOF 42.0 g (0.2 mol), BaF$_2$ 27.0 g (0.1595 mol), BaBr$_2$.2H$_2$O 133.3 g (0.4 mol), CaF$_2$ 18.74 g (0.24 mol), EuF$_3$ 0.104 g (0.0005 mol)

(8) LuOF 10.5 g (0.05 mol), BaF$_2$ 16.0 g (0.0945 mol), BaBr$_2$.2H$_2$O 158.3 g (0.475 mol), ZnF$_2$ 39.3 g (0.38 mol), EuF$_3$ 0.104 g (0.0005 mol)

(9) LuOF 42.0 g (0.2 mol), BaF$_2$ 40.55 g (0.2395 mol), BaI$_2$.2H$_2$O 170.9 g (0.4 mol), MgF$_2$ 9.97 g (0.16 mol), EuF$_3$ 0.104 g (0.0005 mol)

(10) Lu$_2$O$_3$ 39.8 g (0.1 mol), LuF$_3$ 23.2 g (0.1 mol), BaF$_2$ 47.3 g (0.2795 mol), BaBr$_2$.2H$_2$O 116.6 g (0.35 mol), BeF$_2$ 3.3 g (0.2795 mol), EuF$_3$ 0.104 g (0.0005 mol)

(11) LuOF 21.0 g (0.1 mol), BaF$_2$ 33.8 g (0.1995 mol), BaBr$_2$.2H$_2$O 83.3 g (0.25 mol), BeF$_2$ 2.35 g (0.05 mol), EuF$_3$ 0.104 g (0.0005 mol)

(12) Lu$_2$O$_3$ 79.6 g (0.2 mol), LuF$_3$ 46.4 g (0.2 mol), BaF$_2$ 27.0 g (0.1595 mol), BaBr$_2$.2H$_2$O 66.6 g (0.2 mol), BeF$_2$ 1.88 g (0.04 mol), EuF$_3$ 0.104 g (0.0005 mol)

(13) YOF 24.8 g (0.2 mol), BaF$_2$ 67.6 g (0.3995 mol), BaBr$_2$.2H$_2$O 133.3 g (0.4 mol), EuF$_3$ 0.104 g (0.0005 mol)

(14) YOF 24.8 g (0.2 mol), BaF$_2$ 33.9 g (0.2 mol), BaBr$_2$.2H$_2$O 133.3 g (0.4 mol), EuF$_3$ 41.8 g (0.2 mol)

(15) YOF 24.8 g (0.2 mol), BaF$_2$ 67.7 g (0.4 mol), BaBr$_2$.2H$_2$O 133.3 g (0.4 mol), EuF$_3$ 0.0002 g ($10^{-6}$ mol)

(16) Y$_2$O$_3$ 15.1 g (0.067 mol), YF$_3$ 9.8 g (0.067 mol), BaF$_2$ 67.6 g (0.3995 mol), BaBr$_2$.2H$_2$O 66.6 g (0.2 mol), BaCl$_2$.2H$_2$O 48.9 g (0.2 mol), EuF$_3$ 0.104 g (0.0005 mol)

(17) YOF 12.4 g (0.1 mol), BaF$_2$ 76.1 g (0.4995 mol), BaI$_2$.2H$_2$O 192.2 g (0.45 mol), EuF$_3$ 0.104 g (0.0005 mol)

(18) YOF 24.8 g (0.2 mol), BaBr$_2$.2H$_2$O 133.3 g (0.4 mol), SrF$_2$ 50.2 g (0.4 mol), EuF$_3$ 0.104 g (0.0005 mol)

(19) YOF 24.8 g (0.2 mol), BaF$_2$ 27.0 g (0.1595 mol), BaBr$_2$.2H$_2$O 133.3 g (0.4 mol), CaF$_2$ 18.74 g (0.2 mol), EuF$_3$ 0.104 g (0.0005 mol)

(20) YOF 6.2 g (0.05 mol), BaF$_2$ 16.0 g (0.0945 mol), BaBr$_2$.2H$_2$O 158.3 g (0.475 mol), ZnF$_2$ 39.3 g (0.38 mol), EuF$_3$ 0.104 g (0.0005 mol)

(21) YOF 24.8 g (0.2 mol), BaF$_2$ 40.55 g (0.2395 mol), BaI$_2$.2H$_2$O 170.9 g (0.4 mol), MgF$_2$ 9.97 g (0.16 mol), EuF$_3$ 0.104 g (0.0005 mol)

(22) Y$_2$O$_3$ 22.6 g (0.1 mol), YF$_3$ 14.6 g (0.1 mol), BaF$_2$ 47.3 g (0.2795 mol), BaBr$_2$.2H$_2$O 116.6 g (0.35 mol), BeF$_2$ 3.3 g (0.07 mol), EuF$_3$ 0.104 g (0.0005 mol)

(23) YOF 12.4 g (0.1 mol), BaF$_2$ 33.8 g (0.1995 mol), BaBr$_2$.2H$_2$O 83.3 g (0.25 mol), BeF$_2$ 2.35 g (0.05 mol), EuF$_3$ 0.104 g (0.0005 mol)

(24) Y$_2$O$_3$ 45.2 g (0.2 mol), YF$_3$ 29.2 g (0.2 mol), BaF$_2$ 27.0 g (0.1595 mol), BaBr$_2$.2H$_2$O 66.6 g (0.2 mol), BeF$_2$ 1.88 g (0.04 mol), EuF$_3$ 0.104 g (0.0005 mol).

The compositions of these phosphors are described in Table 2 along with compositions of the comparison phosphors used to measure relative luminous intensity. In each case, luminous intensity of the stimulated radiation was measured when the phosphor was scanned by argon light having a wavelength of 550 nm after being exposed to an 80 kV$_p$ X-ray.

TABLE 2

Relative Luminous Intensity (RI) of Phosphors According to the Invention, Compared to Prior Art Phosphors

| Example | Composition[2] | RI |
|---|---|---|
| 1 | 0.2LuOF.0.8BaFBr: Eu$_{0.0005}$ | 154 |
|   | BaFBr: Eu$_{0.0005}$ | 100 |
| 2 | 0.2LuOF.0.8BaFBr: Eu$_{0.2}$ | 109 |
|   | BaFBr: Eu$_{0.0005}$ | 100 |
| 3 | 0.2LuOF.0.8BaFBr: Eu$_{10^{-6}}$ | 103 |
|   | BaFBr: Eu$_{0.0005}$ | 100 |
| 4 | 0.2LuOF.0.8BaFCl$_{0.5}$Br$_{0.5}$: Eu$_{0.0005}$ | 150 |
|   | BaFCl$_{0.5}$Br$_{0.5}$: Eu$_{0.0005}$ | 100 |
| 5 | 0.1LuOF.0.9BaFI: Eu$_{0.0005}$ | 130 |
|   | BaFI: Eu$_{0.0005}$ | 100 |
| 6 | 0.2LuOF.0.8Ba$_{0.5}$Sr$_{0.5}$FBr: Eu$_{0.0005}$ | 152 |
|   | Ba$_{0.5}$Sr$_{0.5}$FBr: Eu$_{0.0005}$ | 100 |
| 7 | 0.2LuOF.0.8Ba$_{0.7}$Ca$_{0.3}$FBr$_{0.5}$Cl$_{0.5}$: Eu$_{0.0005}$ | 137 |
|   | Ba$_{0.7}$Ca$_{0.3}$FBr$_{0.5}$Cl$_{0.5}$: Eu$_{0.0005}$ | 100 |
| 8 | 0.05LuOF.0.95Ba$_{0.6}$Zn$_{0.4}$FBr: Eu$_{0.0005}$ | 122 |
|   | Ba$_{0.6}$Zn$_{0.4}$FBr: Eu$_{0.0005}$ | 100 |
| 9 | 0.2LuOF.0.8Ba$_{0.8}$Mg$_{0.2}$FI: Eu$_{0.0005}$ | 141 |
|   | Ba$_{0.8}$Mg$_{0.2}$FI: Eu$_{0.0005}$ | 100 |
| 10 | 0.3LuOF.0.7Ba$_{0.9}$Be$_{0.1}$FBr: Eu$_{0.0005}$ | 148 |
|   | Ba$_{0.9}$Be$_{0.1}$FBr: Eu$_{0.0005}$ | 100 |
| 11 | 0.5LuOF.0.5Ba$_{0.9}$Be$_{0.1}$FBr: Eu$_{0.0005}$ | 130 |
|   | Ba$_{0.9}$Be$_{0.1}$FBr: Eu$_{0.0005}$ | 100 |
| 12 | 0.6LuOF.0.4Ba$_{0.9}$Be$_{0.1}$FBr: Eu$_{0.0005}$ | 106 |
|   | Ba$_{0.9}$Be$_{0.1}$FBr: Eu$_{0.0005}$ | 100 |
| 13 | 0.2YOF.0.8BaFBr: Eu$_{0.0005}$ | 151 |
|   | BaFBr: Eu$_{0.0005}$ | 100 |
| 14 | 0.2YOF.0.8BaFBr: Eu$_{0.2}$ | 107 |
|   | BaFBr: Eu$_{0.0005}$ | 100 |
| 15 | 0.2YOF.0.8BaFBr: Eu$_{1.0}$ | 101 |
|   | BaFBr: Eu$_{0.0005}$ | 100 |
| 16 | 0.2YOF.0.8BaFCl$_{0.5}$Br$_{0.5}$: Eu$_{0.0005}$ | 146 |
|   | BaFCl$_{0.5}$Br$_{0.5}$: Eu$_{0.0005}$ | 100 |
| 17 | 0.1YOF.0.9BaFI: Eu$_{0.0005}$ | 128 |
|   | BaFI: Eu$_{0.0005}$ | 100 |
| 18 | 0.2YOF.0.8Ba$_{0.5}$Sr$_{0.5}$FBr: Eu$_{0.0005}$ | 149 |
|   | Ba$_{0.5}$Sr$_{0.5}$FBr: Eu$_{0.0005}$ | 100 |
| 19 | 0.2YOF.0.8Ba$_{0.7}$Ca$_{0.3}$FBr$_{0.5}$Cl$_{0.5}$: Eu$_{0.0005}$ | 135 |
|   | Ba$_{0.7}$Ca$_{0.3}$FBr$_{0.5}$Cl$_{0.5}$: Eu$_{0.0005}$ | 100 |
| 20 | 0.05YOF.0.95Ba$_{0.6}$Zn$_{0.4}$FBr: Eu$_{0.0005}$ | 110 |
|   | Ba$_{0.6}$Zn$_{0.4}$FBr: Eu$_{0.0005}$ | 100 |
| 21 | 0.2YOF.0.8Ba$_{0.8}$Mg$_{0.2}$FI: Eu$_{0.0005}$ | 128 |
|   | Ba$_{0.8}$Mg$_{0.2}$FI: Eu$_{0.0005}$ | 100 |
| 22 | 0.3YOF.0.7Ba$_{0.9}$Be$_{0.1}$FBr: Eu$_{0.0005}$ | 139 |
|   | Ba$_{0.9}$Be$_{0.1}$FBr: Eu$_{0.0005}$ | 100 |
| 23 | 0.5YOF.0.5Ba$_{0.9}$Be$_{0.1}$FBr: Eu$_{0.0005}$ | 126 |
|   | Ba$_{0.9}$Be$_{0.1}$FBr: Eu$_{0.0005}$ | 100 |
| 24 | 0.6YOF.0.4Ba$_{0.9}$Be$_{0.1}$FBr: Eu$_{0.0005}$ | 104 |
|   | Ba$_{0.9}$Be$_{0.1}$FBr: Eu$_{0.0005}$ | 100 |

[2]In each example, the first composition is of a phosphor according to the invention, while the second is of the prior art phosphor used for comparison. The luminous intensity of the comparison phosphor is always taken to be 100.

As can be seen from the table, the phosphors of the invention, which include LuOF or YOF, emit stimulated radiation with a higher luminous intensity then that of comparison phosphors without LuOF or YOF.

In addition to emitting stimulated radiation of greater luminous intensity, the phosphors of the present invention have other desirable characteristics. First, because they are sensitive to higher-energy argon laser light, they may be scanned by this light and therefore produce a higher level of stimulated radiation than can phosphors which are sensitive only to lower-energy light.

Another advantage is that these phosphors may easily be "erased," since the stored energy is effectively radiated by the scanning radiation. When the phosphors of the present invention are used on a reusable X-ray imaging plate, they are "read" with scanning radiation of a given intensity; and then the residual image is erased with energy of a higher intensity.

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

We claim:

1. A phosphor having the formula $$aReOF \cdot (1-a)Ba_{(1-x)}M_xFX:Eu_y,$$

where:
Re is one element selected from the group consisting of Lu and Y;
M is at least one element selected from the group consisting of Be, Mg, Ca, Sr, Zn, and Cd;
X is at least one element selected from the group consisting of Cl, Br, and I;
a is greater than zero but less than or equal to 0.6;
x is in the range from 0 to 0.5, inclusive;
y is in the range from $10^{-6}$ to $2 \times 10^{-1}$, inclusive; and
where "a" is an amount such that the phosphor exhibits a higher luminous intensity than said phosphor absent ReOF when stimulated by light having a wavelength of 550 nm after being exposed to X-ray radiation.

2. A phosphor according to claim 1, wherein a is in the range from 0.05 to 0.5, inclusive.

3. A phosphor according to claim 1, wherein x is less than or equal to 0.2.

4. A phosphor according to claim 1, wherein y is in the range from $10^{-5}$ to $10^{-2}$, inclusive.

* * * * *